March 6, 1962 G. M. PFUNDT 3,024,000
CABLE LASHING MACHINE
Original Filed Aug. 16. 1957 4 Sheets-Sheet 2

INVENTOR.
George M. Pfundt,
BY Paul & Paul
ATTORNEYS.

March 6, 1962  G. M. PFUNDT  3,024,000
CABLE LASHING MACHINE
Original Filed Aug. 16, 1957  4 Sheets-Sheet 3

INVENTOR.
George M. Pfundt,
BY Paul & Paul
ATTORNEYS.

March 6, 1962 G. M. PFUNDT 3,024,000
CABLE LASHING MACHINE
Original Filed Aug. 16, 1957 4 Sheets-Sheet 4

INVENTOR.
George M. Pfundt,
BY Paul & Paul
ATTORNEYS.

United States Patent Office 3,024,000
Patented Mar. 6, 1962

3,024,000
CABLE LASHING MACHINE
George M. Pfundt, Bustleton Pike, Churchville, Pa.
Original application Aug. 16, 1957, Ser. No. 678,585, now Patent No. 2,953,349, dated Sept. 20, 1960. Divided and this application Jan. 6, 1960, Ser. No. 892
2 Claims. (Cl. 254—134.3)

This invention relates to a cable lashing machine of the type used in tying telephone cables to supporting steel cables or strands and more particularly to improvements in the driving and supporting structure of such a machine.

Cable lashing machines of the general type here involved are illustrated in Patent No. 2,544,313, Harley, March 6, 1951, and Patent No. 2,663,544, Harley, December 22, 1953.

It is a principal purpose of this invention to provide an improved cable lashing machine in which the lay of the lashing wire is directly related to the linear travel of the machine along the supporting steel cable.

It is also an object of this invention to provide a cable lashing machine in which the driving mechanism operates in response to the linear travel of the machine along the supporting cable and in which this response is independent of the force of gravity on the machine.

It is a further object of this invention to provide a cable lashing machine having adjustable means for drawing the telephone cable into proximity with the supporting steel cable wherein the vertical position of the supporting means with respect to the machine may be easily varied.

This aplication is a division of my copending application Serial No. 678,585 filed August 16, 1957, now Patent No. 2,953,349.

Other objects and advantages will be apparent from the following description and drawings of which:

Figure 1:
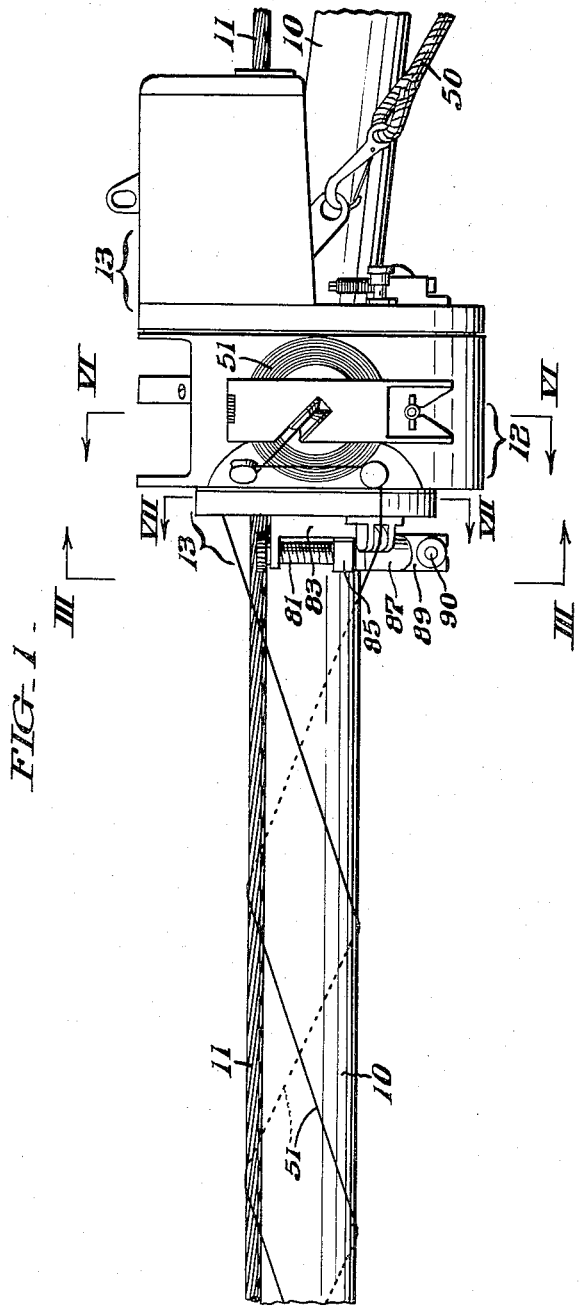
FIG. 1 is a side elevation of a cable lashing machine made in accordance with the invention.

The cable lashing machine shown in FIG. 1 is mounted on strand 11 and the telephone cable 10. It is pulled along by rope 50 or some other suitable towing means. The lashing wire 51 is mounted on a reel on drum 12 and is payed out to the rear of the machine and moved about cable 10 and strand 11 as the machine moves forward and drum 12 rotates about frame 13.

Figure 2:
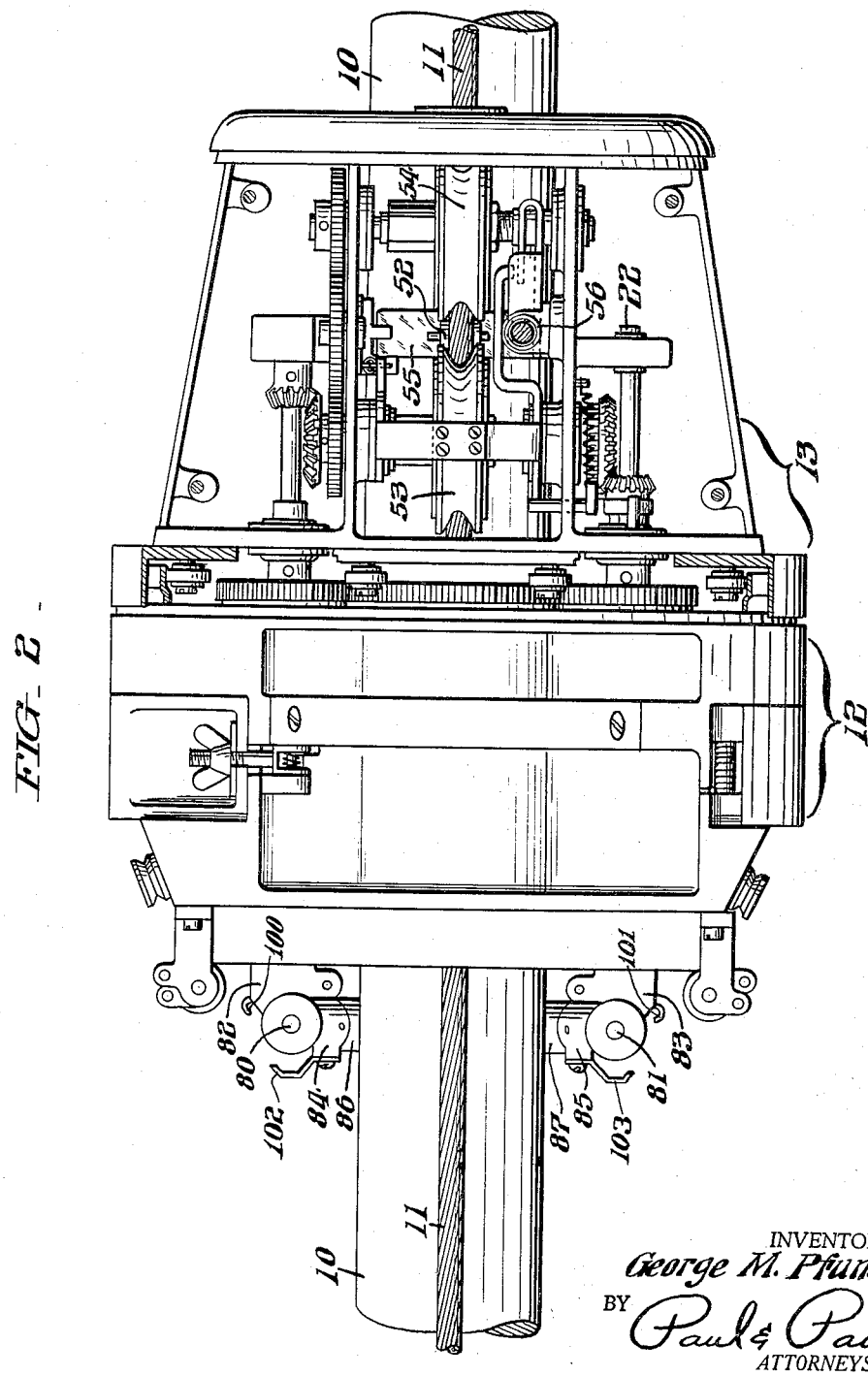
FIG. 2 is a plan view partly cut away of the cable lashing machine of FIG. 1.

FIG. 2 illustrates the internal structure of the cable lashing machine in which the drive traction is enhanced by means of a roller 52 mounted on the frame 13 beneath and between drive wheels 53 and 54. The roller 52 is mounted on bracket 55 which is vertically slideable with respect to frame 13. The bracket 55 is normally urged upward against the strand 11 by coil spring 56. The traction of the drive wheels 53 and 54 on strand 11 is enhanced by additional structure fully disclosed and described in my co-pending application Serial No. 678,585 filed August 16, 1957 of which this application is a division.

Figure 3:
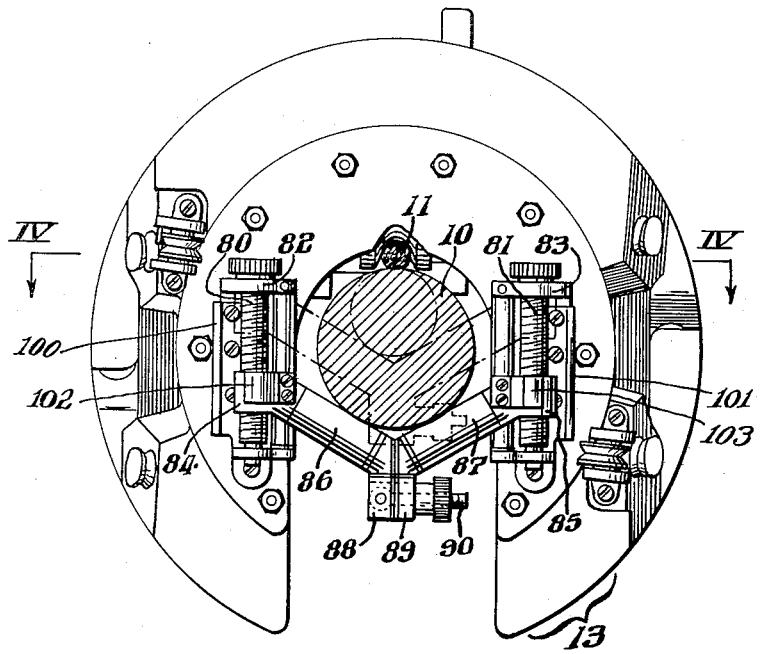
FIG. 3 is a view along the line III—III of FIG. 1.
Figure 4:
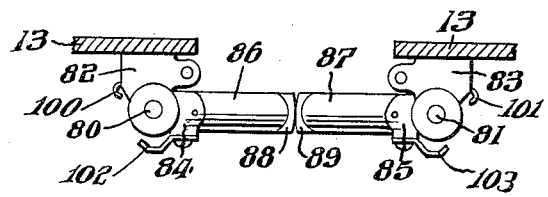
FIG. 4 is a detailed view of the rear cable lifting structure taken along the line IV—IV of FIG. 3.
Figure 5:
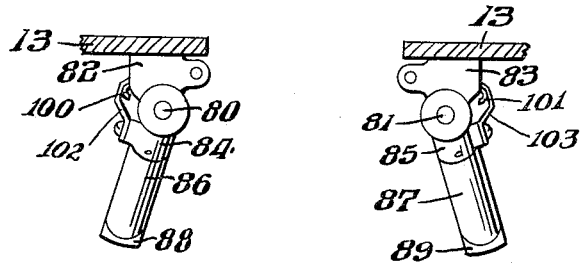
FIG. 5 shows the rear cable lifter of FIG. 4 in an open position.
Figure 6:
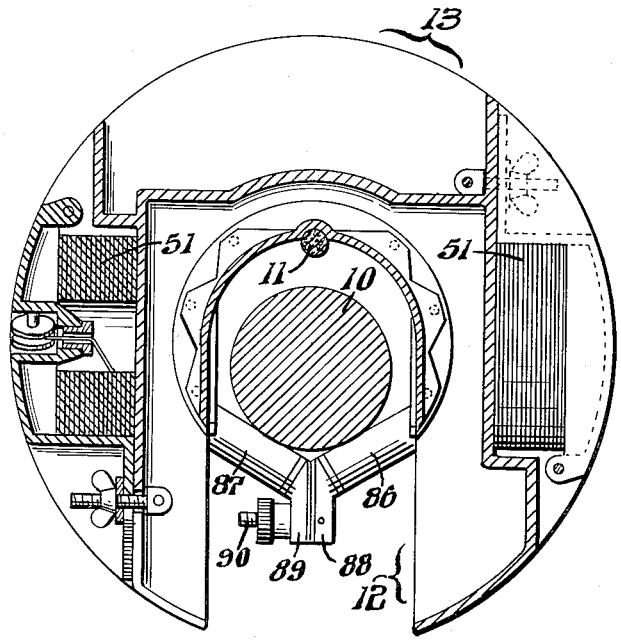
FIG. 6 is a view along the line VI—VI of FIG. 1.
Figure 7:
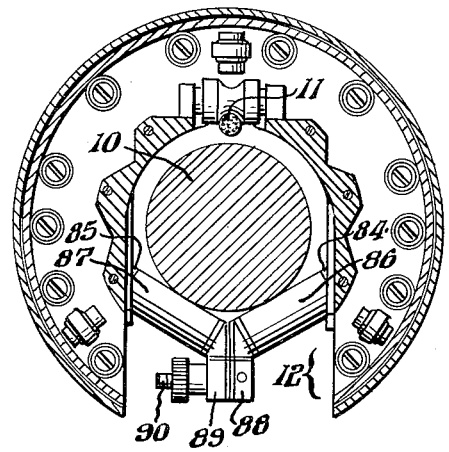
FIG. 7 is a sectional view along the line VII—VII of FIG. 1.

At the rear of the machine is provided a cable lifting assembly for lifting the cable 10 substantially into contact with the strand 11. A pair of vertically threaded rods 80 and 81 are rotatably mounted in brackets 82 and 83 respectively. Threaded blocks 84 and 85 are mounted on rods 80 and 81 respectively and are adapted to move upward or downward in response to the rotation of the rods. Roller 86 is rigidly attached to block 84 and roller 87 to block 85 as shown in FIG. 3. The rollers 86 and 87 extend toward each other at an angle as shown in the drawings. The exact size of the angle formed by rollers 86 and 87 is not vitally important to the success of the invention, but an angle of about 130° is satisfactory. For most purposes it is essential that the angle between the rollers 86 and 87 be less than 180° so that they do not lie in a straight line. On the other hand the angle should not be so small as to limit the approachability of the rollers 86 and 87 to the strand 11. Retaining fingers 102 and 103 are attached to blocks 84 and 85 respectively. Retaining hooks 100 and 101 are attached to brackets 82 and 83 respectively. Retaining fingers 102 and 103 and retaining hooks 100 and 101 are so arranged that when the rollers 86 and 87 are swung to their open position as shown in FIG. 5, the retaining fingers 102 and 103 are held in position by retaining hooks 100 and 101 respectively. This enables the cable lashing machine to be mounted on the strand 11 without interference from the rollers 86 and 87. When the cable lashing machine is in position the rollers are swung back to their engaging position as shown in FIG. 4 releasing retaining fingers 102 and 103 from their engagement with retaining hooks 100 and 101. Rollers 86 and 87 are joined by abutting plates 88 and 89 respectively and the hinged threaded rod 90 as shown in FIGS. 3 and 4. As shown in FIG. 4 the abutting plates 88 and 89 are curved to enable the rollers 86 and 87 to swing into abutting engagement when they are pivoted about their respective threaded rods. The rollers 86 and 87 may be separated by rotating them about rods 80 and 81 respectively. By means of adjustable rollers 86 and 87 cable 10 of any standard size may be accommodated in the cable lashing machine andd rawn upward substantially into contact with the strand 11. The angle between rollers 86 and 87 tends to maintain cable 10 in a relatively fixed position under the strand regardless of the size of the cable 10. The vertical adjustability as shown in FIG. 3 in dot-dash makes it possible to accommodate smaller sizes of cable.

Many variations may be made in the various elements of the specific embodiments of the invention described herein without departing from the spirit of the invention as defined by the following claims.

What is claimed is:

1. In a cable lashing machine, cable lifting means comprising a pair of spaced substantially parallel, rotatable threaded rods mounted on either side of the rear opening of said machine, a roller mounted on each of said rods at an angle to said rods and each other, said rollers being adapted to pivot about said rods into abutting engagement with each other, threaded means for mounting said rollers on said rods for vertical movement of said rollers when said rods are rotated and locking means for locking said rolers together across the rear opening of said machine.

2. The structure of claim 1 wherein the said locking means comprises abutting plates affixed to each of said rollers respectively, a hinged threaded rod connecting said abutting plates and screw means mounted on said threaded rod for affixing said abutting plates together and wherein a retaining finger is connected to each roller and a cooperating retaining hook is mounted on each side of the rear end of said cable lashing machine for holding said retaining finger and said roller in open position.

References Cited in the file of this patent
UNITED STATES PATENTS 2,272,253    St. John _____ Feb. 10, 1942
2,592,943    Neale _____ Apr. 15, 1952